US007805684B2

(12) United States Patent
Arvilommi (10) Patent No.: US 7,805,684 B2
(45) Date of Patent: Sep. 28, 2010

(54) MOBILE COMMUNICATIONS TERMINAL

(75) Inventor: Jaakko Arvilommi, Turku (FI)

(73) Assignee: Nokia Corporation, Espoo (FI)

( * ) Notice: Subject to any disclaimer, the term of this patent is extended or adjusted under 35 U.S.C. 154(b) by 268 days.

(21) Appl. No.: 11/469,585

(22) Filed: Sep. 1, 2006

(65) Prior Publication Data

US 2008/0059908 A1 Mar. 6, 2008

(51) Int. Cl.
*G06F 3/048* (2006.01)
*G06F 3/14* (2006.01)

(52) U.S. Cl. .................. 715/829; 715/853; 715/854; 715/855; 715/864

(58) Field of Classification Search ............. 715/829, 715/853–855, 864
See application file for complete search history.

(56) References Cited

U.S. PATENT DOCUMENTS

| | | | | | |
|---|---|---|---|---|---|
| 6,049,336 | A | * | 4/2000 | Liu et al. ................ | 715/830 |
| 6,348,935 | B1 | * | 2/2002 | Malacinski et al. ......... | 715/853 |
| 6,417,873 | B1 | * | 7/2002 | Fletcher et al. ............ | 715/853 |
| 6,452,609 | B1 | * | 9/2002 | Katinsky et al. ............ | 715/716 |
| 2002/0147728 | A1 | * | 10/2002 | Goodman et al. ........ | 707/104.1 |
| 2003/0095155 | A1 | * | 5/2003 | Johnson ....................... | 345/864 |
| 2004/0075698 | A1 | * | 4/2004 | Gao et al. .................... | 345/854 |
| 2005/0076309 | A1 | * | 4/2005 | Goldsmith .................. | 715/811 |
| 2006/0282789 | A1 | * | 12/2006 | Kim ............................ | 715/764 |
| 2007/0038941 | A1 | * | 2/2007 | Wysocki et al. ............. | 715/748 |
| 2007/0168865 | A1 | * | 7/2007 | Tsutsumi et al. ............ | 715/716 |
| 2007/0192711 | A1 | * | 8/2007 | Lee et al. .................... | 715/764 |
| 2007/0192712 | A1 | * | 8/2007 | Lee et al. .................... | 715/764 |
| 2007/0192713 | A1 | * | 8/2007 | Lee et al. .................... | 715/764 |
| 2007/0192714 | A1 | * | 8/2007 | Lee et al. .................... | 715/764 |

FOREIGN PATENT DOCUMENTS

| | | |
|---|---|---|
| EP | 1550944 | 7/2005 |
| WO | 2006048819 | 5/2006 |

OTHER PUBLICATIONS

Apple Computer, Inc., Ipod User Guide, © 2002, pp. 1-3.*
International Search Report dated Apr. 11, 2008.
Written Opinion dated Apr. 11, 2008.

* cited by examiner

*Primary Examiner*—William L Bashore
*Assistant Examiner*—Ashraf Zahr (57) ABSTRACT

A mobile communication apparatus including a display and means for navigating among items displayed on the display, arranged to display a first list of items belonging to a higher hierarchical level on the display and being capable of enabling selection of a first item among the higher hierarchical level items by the means for navigation is disclosed. Upon selection of the first item, being arranged to insert and display a second list including at least one item belonging to a lower hierarchical level between the first item and subsequent higher hierarchical level items for enabling selection of a second item from the second list, wherein the second list is hierarchically associated with the first item. A corresponding application, apparatus and computer program is also disclosed.

25 Claims, 8 Drawing Sheets

MOBILE COMMUNICATIONS TERMINAL

TECHNICAL FIELD

The disclosed embodiments relate to methods for displaying and selecting items in a portable apparatus, a rendering application, a portable apparatus comprising a display and means for navigating, and a computer-readable medium having computer-executable components.

BACKGROUND

Many times, items are stored in a device with processing and storage capabilities, such as a computer, a portable media player, and nowadays also mobile communication apparatuses, arranged in a hierarchical tree structure. The items in the tree structure are assigned a hierarchical level, and each item, except items on the top or 'root' level, is associated with another item on a higher level. As the number of items increases, and/or the complexity of the tree structure increases, it becomes more cumbersome for a user to manage browsing the items and to keep track of its position in the hierarchical tree structure. This is especially problematic in an apparatus with a small physical size, since the display of the device accordingly provides less displaying area. U.S. Pat. No. 6,928,433 B2, which is hereby incorporated by reference, discloses a solution for organizing and selecting tracks for a playlist in a portable music player. However, it is believed that improvements can be made that facilitates for a user to select among a plurality of items.

SUMMARY

In view of the above, it would be advantageous to solve or at least reduce the problems discussed above. In particular, an objective is to provide a user friendly and display space efficient selection and browsing of items in a portable apparatus.

According to a first aspect of the disclosed embodiment, there is provided a method for a portable apparatus, comprising:

displaying a first list of items belonging to a higher hierarchical level in a display view;

enabling selection of a first item among said higher hierarchical level items; and upon selection of said first item, inserting a second list in said display view, comprising at least one item belonging to a lower hierarchical level between said first item and subsequent higher hierarchical level items for enabling selection of a second item from said second list, wherein said second list is hierarchically associated with said first item.

The method may comprise displaying a further list (a third list, fourth list, fifth list, etc.) in said display view, upon selection of a previous item, such as said item from second list (or item from a third list, fourth list, fifth list, etc.), in a previous inserted list (or a third list, fourth list, fifth list, etc.), the further list comprising at least one item belonging to a lower hierarchical level between said previous item and previous subsequent items, for enabling selection of a item from said further list, wherein said further list is hierarchically associated with said previous item.

The method may comprise displaying a further list in a display view other than said display view, upon selection of said previous item, the further list comprising at least one item, belonging to the lowest hierarchical level between said previous item and subsequent previous items, for enabling rendering of a further item from said further list belonging to the lowest hierarchical level, wherein said further list is hierarchically associated with said previous item.

The method may comprise indenting said inserted second list compared to said first list.

The method may comprise indenting said inserted further list compared to said previous list.

The method may comprise rendering a media item belonging to the lowest hierarchical level, associated with said previous item, upon selection of said media item belonging to the lowest hierarchical level.

The method may comprise scrolling items such that said first item is displayed uppermost of the displayed items.

The method may comprise providing symbols as visual cues to differentiate between said lists.

The method may comprise providing symbols, at the top of said display view, as visual cues to indicate active level in the hierarchical structure.

The method may comprise providing arrows as visual cues to indicate the existence of selectable sub levels containing hierarchical connected items.

The method wherein said items are items of the group comprising:

a media library item, a playlist item, and a tracklist item.

The method may comprise selection from any list in the hierarchical structure.

According to a second aspect of the disclosed embodiments, there is provided a media rendering application for a portable apparatus comprising a display and a navigation means, said application causing a first list of items belonging to a higher hierarchical level to be displayed in a display view and being capable of enabling selection of a first item among said higher hierarchical level items by said navigation means, wherein, upon selection of said first item, being arranged to cause insertion in said display view of a second list comprising at least one item belonging to a lower hierarchical level between said first item and subsequent higher hierarchical level items for enabling selection of a second item from said second list, wherein said second list is hierarchically associated with said first item.

An application arranged to display a further list in said display view, upon selection of said previous item in a previous inserted list, the further list comprising at least one item belonging to a lower hierarchical level between said previous item and previous subsequent items for enabling selection of a item from said further list, wherein said further list is hierarchically associated with said previous item.

An application arranged to display a further list in a display view other than said display view, upon selection of said previous item, the further list comprising at least one item, belonging to the lowest hierarchical level between said previous item and subsequent previous items, for enabling rendering of a further item from said further list belonging to the lowest hierarchical level, wherein said further list is hierarchically associated with said previous item.

According to a third aspect of the disclosed embodiments, there is provided an apparatus comprising a display and a navigation device arranged to navigate among items displayed on said media player display, arranged to display a view comprising a first list of items belonging to a higher hierarchical level on said display and being capable of enabling selection of a first item among said higher hierarchical level items by said navigation device, wherein upon selection of said first item, being arranged to insert into said view a second list on said display comprising at least one item belonging to a lower hierarchical level between said first item and subsequent higher hierarchical level items for enabling selection of a second item from said second list, wherein said second list is hierarchically associated with said first item.

An apparatus arranged to display a further list in said display view, upon selection of said previous item in a previous inserted list, the further list comprising at least one item belonging to a lower hierarchical level between said previous item and previous subsequent items for enabling selection of a item from said further list, wherein said further list is hierarchically associated with said previous item.

An apparatus arranged to display a further list in another display view, upon selection of said previous item, the further list comprising at least one item, belonging to the lowest hierarchical level between said previous item and subsequent previous items, for enabling rendering of a further item from said further list belonging to the lowest hierarchical level, wherein said further list is hierarchically associated with said previous item.

According to a fourth aspect of the disclosed embodiments, there is provided a computer-readable medium having computer-executable components comprising instructions for displaying a first list of items in a display view belonging to a higher hierarchical level in a display view;

enabling selection of a first item among said higher hierarchical level items; and upon selection of said first item, inserting in said display view, a second list comprising at least one item belonging to a lower hierarchical level, between said first item and subsequent higher hierarchical level items for enabling selection of a second item from said second list, wherein said second list is hierarchically associated with said first item.

A computer-readable medium having computer-executable components comprising instructions for displaying a further list in said display view, upon selection of said previous item in a previous inserted list, the further list comprising at least one item belonging to a lower hierarchical level between said previous item and previous subsequent items for enabling selection of a item from said further list, wherein said further list is hierarchically associated with said previous item.

A computer-readable medium having computer-executable components comprising instructions for displaying a further list in a display view other than said display view, upon selection of said previous item, the further list comprising at least one item, belonging to the lowest hierarchical level between said previous item and subsequent previous items, for enabling rendering of a further item from said further list belonging to the lowest hierarchical level, wherein said further list is hierarchically associated with said previous item.

The second, third and fourth aspects of the present invention may be combined in any way with the features of the first aspect of the disclosed embodiments.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

Other features and advantages of the disclosed embodiments will appear from the following detailed disclosure, from the attached dependent claims as well as from the drawings.

BRIEF DESCRIPTION OF THE DRAWINGS

The above, as well as additional, features and advantages of the disclosed embodiments, will be better understood through the following illustrative and non-limiting detailed description of preferred embodiments, with reference to the appended drawings, where the same reference numerals will be used for similar elements, wherein:

FIG. 2,*a-b*, shows exemplary display views according to another embodiment;

DETAILED DESCRIPTION OF PREFERRED EMBODIMENTS

Figure 1:
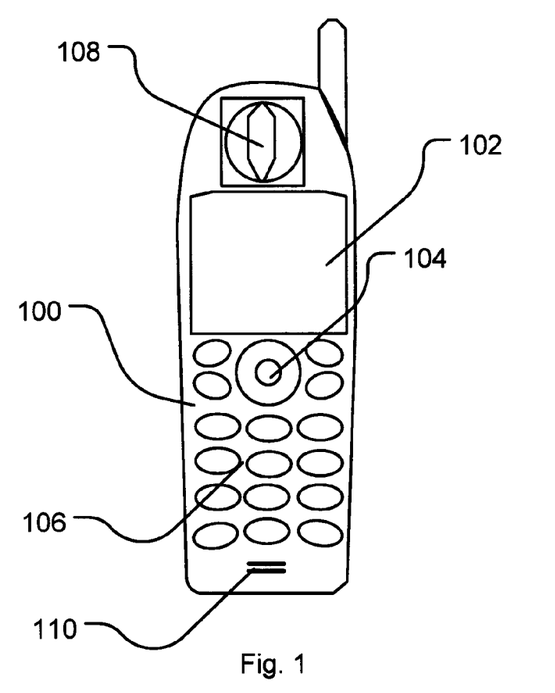
FIG. 1 shows a mobile communication apparatus according to one embodiment.

FIG. 1 shows a mobile communication apparatus 100 comprising a display 102 and means 104 for navigating among items (not shown) displayed in a display area 102. The navigation means 104 can be a rotating input, a joystick, a touch pad, but can also be implemented using a touch sensitive display, wherein the displayed items directly can be tapped by a user for selection, or be voice activated via a headset or a built-in microphone. The mobile communication apparatus can also comprise other elements normally present in such an apparatus, such as a keypad 106, a speaker 108, a microphone 110, a processor (not shown), a memory (not shown), etc.

Figure 2A:
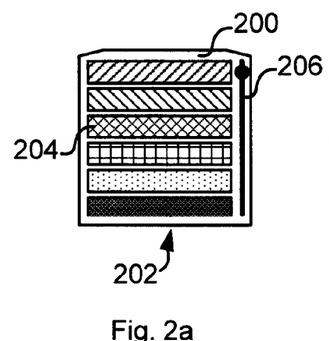
Figure 2B:
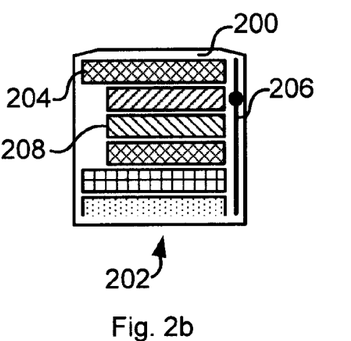
Figure 2C:
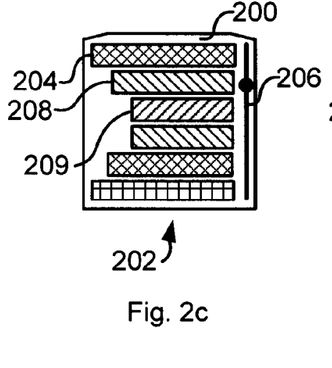
Figure 2D:
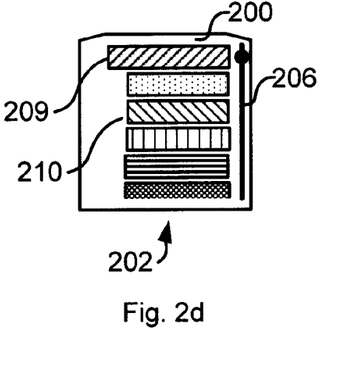

FIG. 2 shows the displaying of items 202 on a display 200 in the form of a list, wherein FIG. 2*a* shows the display 200 displaying a number of items, indicated by the patterned bars, in a first list. Assume that the third uppermost item 204 is selected. The selected item 204 will preferably be displayed on the top of the display view and the entire items list is thus scrolled, indicated by the scroll bar 206, in such way that the selected item 204 ends up on the top of the display view, as shown in FIG. 2*b*. Further, upon selection of the item 204, a second list of items is inserted between the selected item 204 and the successive items of the first list in the display view, illustrated in FIG. 2*b*, wherein the items of the second list are hierarchically associated with the selected item 204. The hierarchical associations with item 204 can further be emphasized by e.g. indenting the second list of items as shown in FIG. 2*b*. A user is thus also enabled to select items also from the second list. If the selected item 204 is re-selected in the state shown in FIG. 2*b*, the second list is preferably concealed, and the view according to FIG. 2*a* is once again displayed. If another item from the first list is selected in the state shown in FIG. 2*b*, another indented list of items is inserted between the another selected item and the successive items of the first list, wherein the items of the another indented list are hierarchically associated with the other selected item. If an item 208 from the second list is selected a third indented list of items is inserted between the selected item 208 and the following items, as is illustrated in FIG. 2c, wherein the items of the third list are hierarchically associated with the selected item 208. Depending on the number of levels in the hierarchy the item selection and list insertion procedure can continue in the same manner until the level above the lowest level in the hierarchy is reached. If an item 209 from the third list, which in FIG. 2c is an item on the level above the last level in the hierarchy, is selected a fourth indented list 210 of items is displayed in a new display view, with item 209 at the top, and a new list of items 210 as illustrated in FIG. 2d, wherein the items of the fourth list 210 are hierarchically associated with the selected item 209. For facilitating navigation of long item lists, a scroll bar 206 can be displayed on the display 200.

The items in FIG. 2 have been assigned patterns instead of real information text to make the disclosure more clear and not to obstruct the principle by text examples only giving understanding to few familiar with knowledge of relations between the items of an example. Similarities between patterns in items in different hierarchical levels are not an illustration of relationship. Thus, same pattern in same hierarchical level illustrates that it is the same item, and items placed below another item but with a slight indent illustrates hierarchical relationship with the item above.

Figure 3:
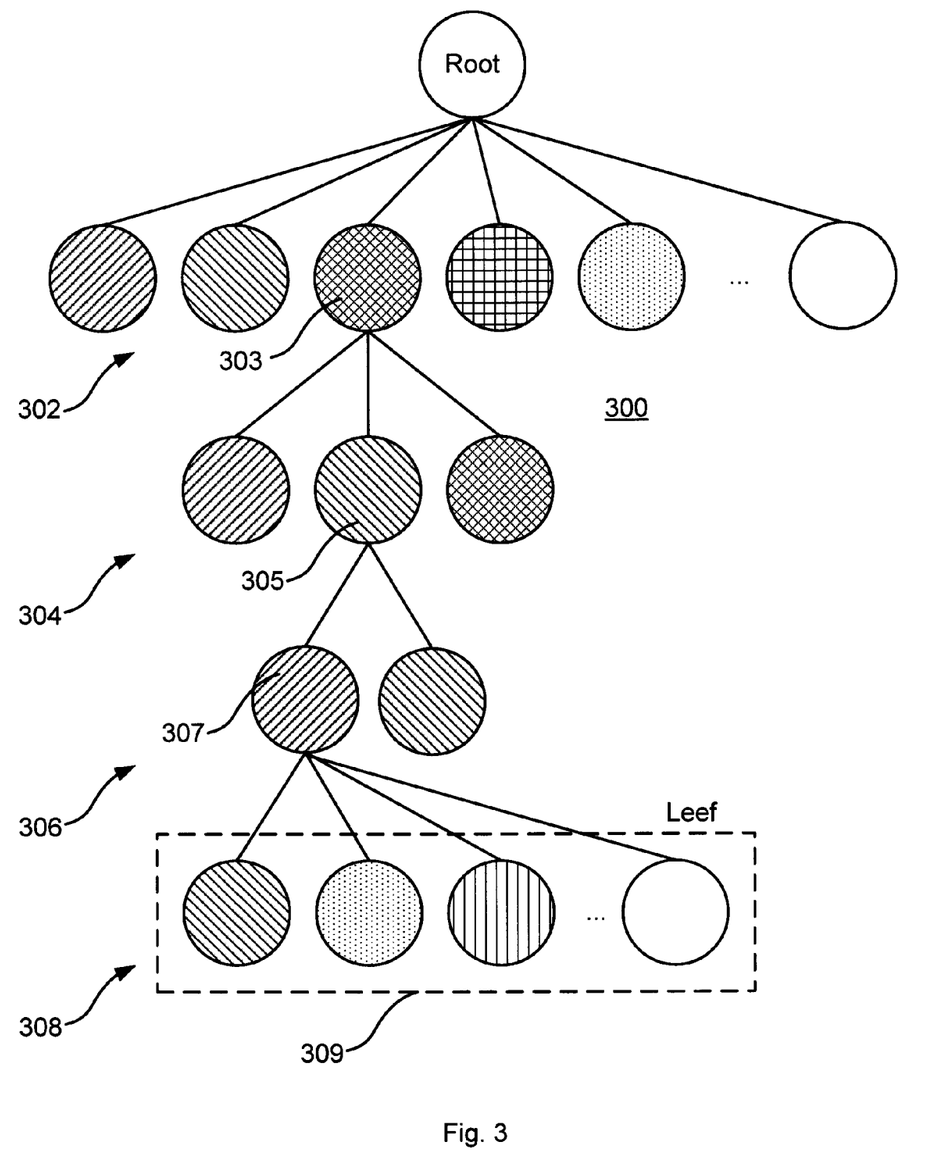
FIG. 3 illustrates a hierarchical structure used in one embodiment.

To illustrate the hierarchy in the example in FIG. 2, FIG. 3 shows a part of the hierarchical structure 300 in the example, wherein the structure can be considered to have an imaginary 'root' under which all of the top items 302 belonging to the highest level of the structure. Among these top items 302, we take a closer look at item 303, which is hierarchically associated to items 304 at the one step lower level in the hierarchy. Among these items 304, we take a closer look at item 305, which is hierarchically associated to items 306 at the further one step lower level in the hierarchy. Among these items 306, we take a closer look at item 307, which is hierarchically associated to items 308 at the lowest level in the hierarchy, which can be referred to as the 'leaf' level in the hierarchical tree structure. As readily can be seen, the above discussed items 302-308 correspond to the items displayed in the example of FIG. 2.

Figure 4:
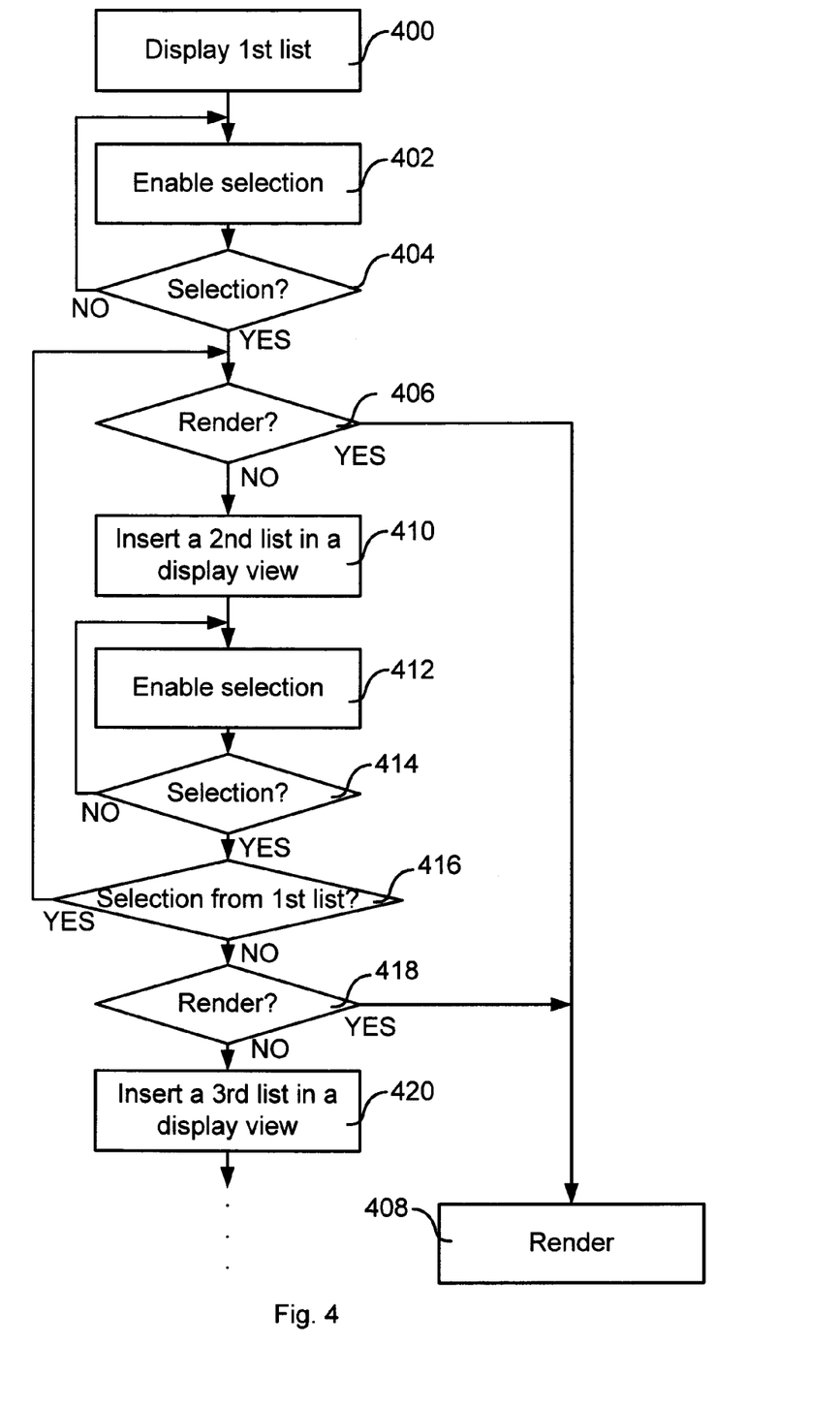
FIG. 4 is a flow chart illustrating a method according to an embodiment.

FIG. 4 is a flow chart illustrating a method according to one embodiment. It is readily understood that the complexity of the method will increase as the number of levels in a corresponding hierarchical structure increases. Thus, the method illustrated by FIG. 4 should be regarded as exemplary, and similar methods related to more or less complex hierarchical structures are readily understood when reading the description below with reference to FIG. 4.

In a displaying step 400, a first list of items belonging to a higher hierarchical level is displayed. Thus, in a selection enablement step 402, a user is enabled to make a selection of a first item among the higher hierarchical level items, wherein it is checked 404 whether any selection is made. Thus, selection enablement step 402 is processed until there has been a selection. It can also be checked 406 if selection indicates that information associated with the selected item should be rendered directly. If that is the case, a rendering step 408 will be processed. Otherwise, a second list of items is inserted and displayed between the first item and subsequent items of the higher hierarchical level in the display view in displaying step 410, wherein the second list comprises items hierarchically associated with the selected first item. Thus, in a second selection enablement step 412, a user is enabled to make a selection of a second item among the displayed items, wherein it is checked 414 whether any selection is made. Thus, the selection enablement step 412 is processed until there has been a selection.

Optionally, there can be checked 416 if the selection is made of an item from the first list, wherein a list of items hierarchically associated with the selected item is inserted and displayed between the selected item and subsequent items of the higher hierarchical level, or, if the selected item is the first item, concealing the second list and thus returning to displaying step 400.

It can also be checked 418 if selection indicates that information associated with the selected item should be rendered directly. If that is the case, a rendering step 408 will be processed. Otherwise, a third list of items is inserted and displayed between the selected item and subsequent items in the displaying view in displaying step 420. This selection process continue until the lowest level in the hierarchical tree structure, the leaf level, is reached and a selected item can be rendered.

Figure 5:
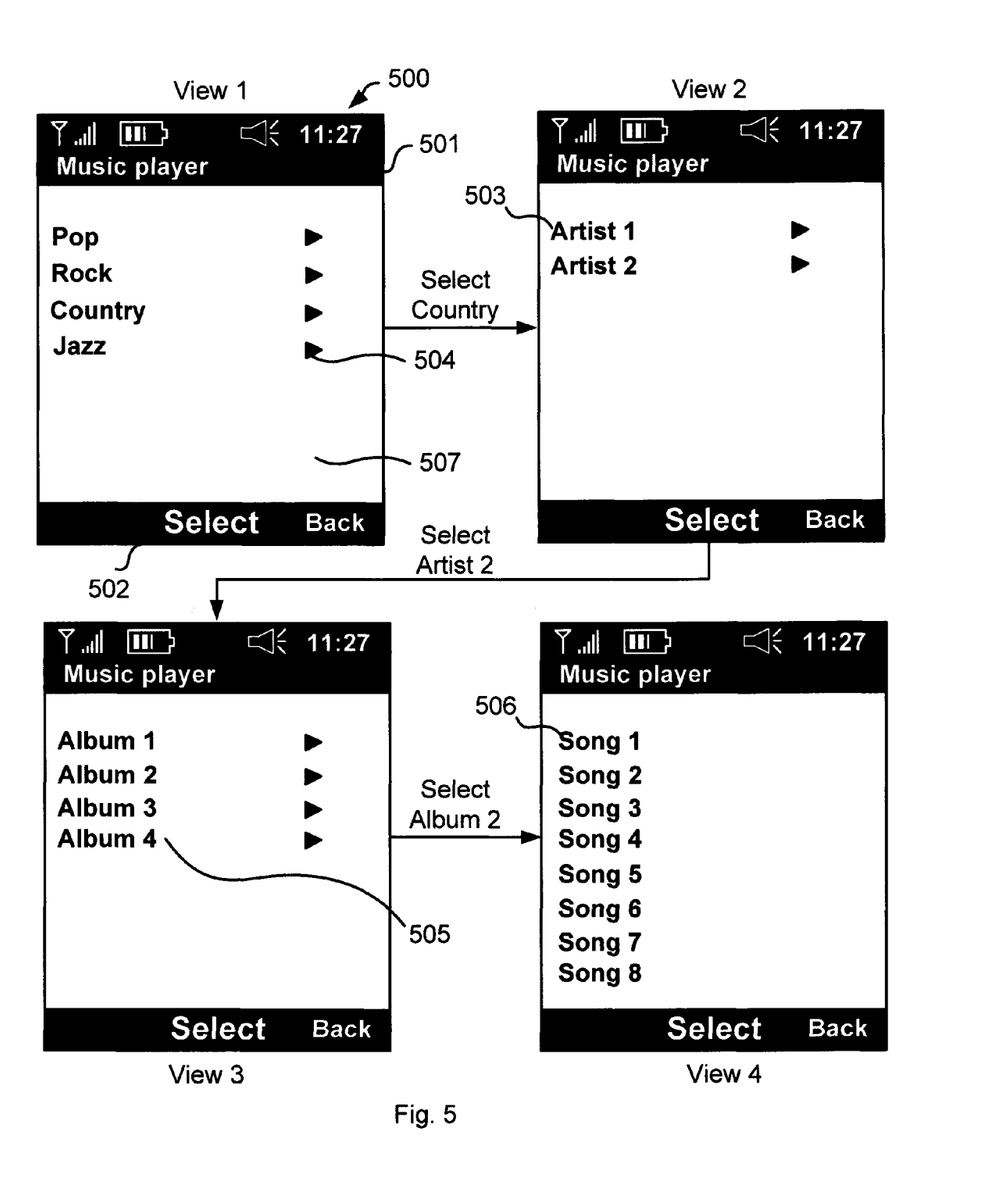
FIG. 5 shows a display view.

FIG. 5 illustrates an example of a common display view in a mobile communication apparatus 500 comprising a general status indication section 501, a softkey bar 502 and a general display area 507. The general status indication section 501 can for example include symbols for battery status, reception quality, speaker on/off, present mode, clock time, etc. The status indication section is not in any way limited to only include these symbols. Thus, other symbols in any shape, form or colour can occur. The softkey bar 502, situated at the bottom of the display view, is operable using the navigation means 104 mentioned in conjunction with FIG. 1. The function of these softkeys are not limited by the functions indicated in the figure.

The preferred function of the general display area 507, residing between the status indication section 500 at the top and the softkey bar 502 at the bottom, is to display information from running applications in the mobile communication apparatus. In our case the display area 507 displays lists of items which are manoeuvrable with the aid of the navigation means 104 in FIG. 1.

Throughout this disclosure, references have been made to a hierarchical structure. The hierarchical structure can be fixed by a specification or application, or dynamically assigned, as will be discussed below.

The navigation and the dynamics of the hierarchy structure will be explained by an series of examples, all in a context of a music library. However, as will be readily understood by a skilled person, the principle applies in a similar way to other contexts, such as phone books, photo albums, web link collections, To Do lists, etc.

A music track can have a set of meta data associated. The meta data can comprise name of artist, song title, album title, composer, producer, genre, etc.

In our example in FIG. 5, the display area further comprises a hierarchical item lists of meta data categories 503 with associated arrows 504 indicating further selectable sub levels of the hierarchically associated items. The user of the mobile communication apparatus can be prompted to select one of the meta data categories define as the highest level in the hierarchy. For example, the meta data category 'Genre' have been selected to be the top level. In view 1 a list of sub level items can then be displayed, such as 'Pop', 'Rock', 'Country', and 'Jazz'. If a user then selects one of the items from the list, for example 'Country', a new display view appears, view 2, displaying a new sub level with, in this case, an item list of country artists 503. A further selection by the user, for example 'Artist 2', will in its turn display a new display view, view 3, where a new hierarchical item list of albums, from that particular artist, which are hierarchical associated with the selected artist item is displayed. If the user for example selects the item 'Album 2' a new display view, view 4, showing a list of items of songs hierarchically related to the selected album list item appears. The songs, which in this particular example is on the lowest level in the hierarchy, can be rendered.

Note that in most mobile communication apparatuses, such as in the example above, the hierarchy association between meta data categories are predefined and not user configurable.

When the amount of items in the meta data categories, such as artists, albums and songs, increases rapidly, as they tend to do in nowadays mobile communication apparatuses with large storage space, the navigation among the hierarchical ordered items becomes cumbersome to navigate and it is easy to lose ones bearings of where in the hierarchical structure one are.

One way of reducing the navigation difficulties and mitigating the feeling of being lost when navigating large amounts of hierarchical structured items, in a in a mobile communication apparatus, or other apparatus with a limited display area such as a PDA, portable media player, etc., is presented in the following examples of the embodiments.

Figure 6:
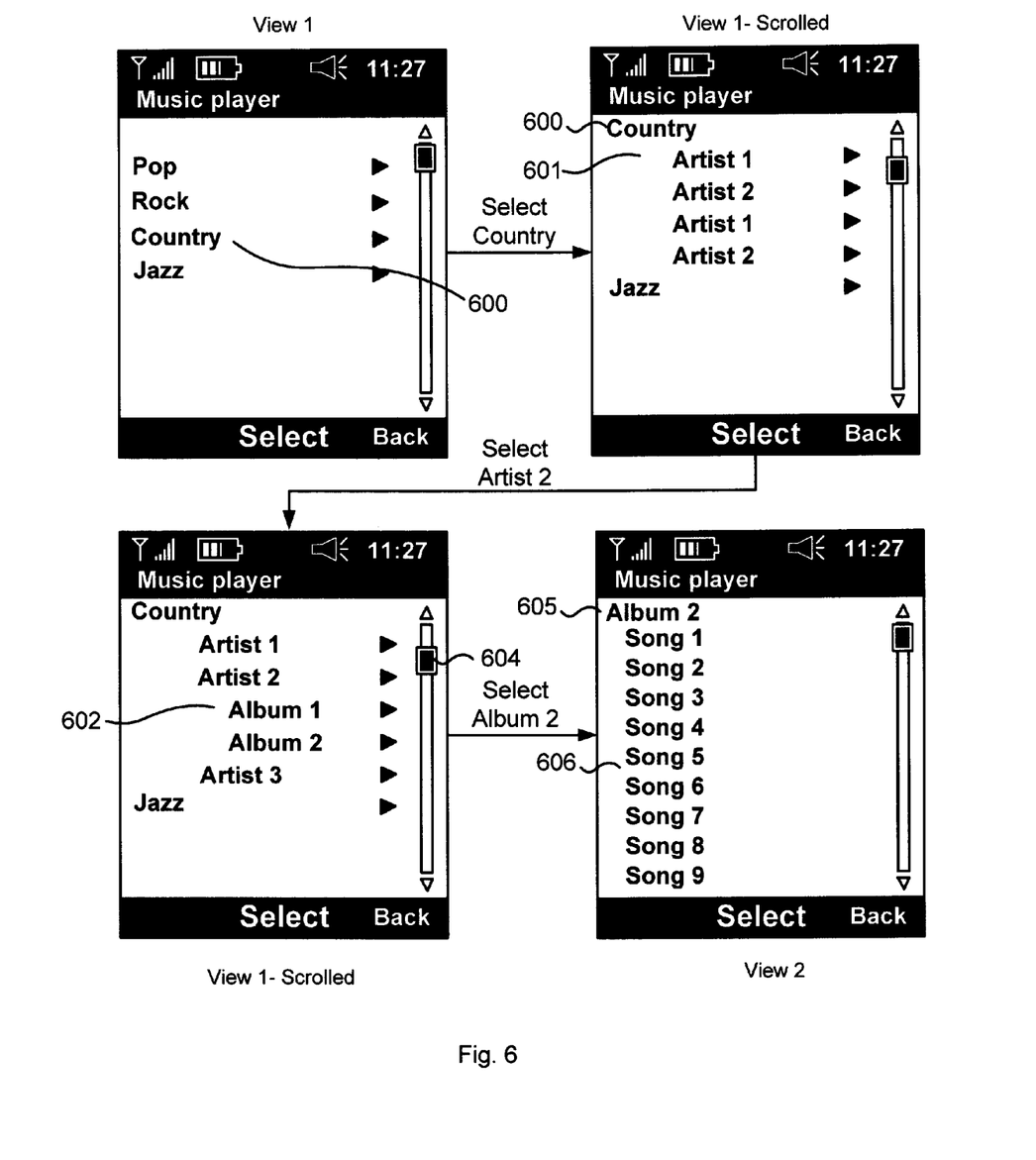
FIG. 6 shows a display view.

FIG. 6 shows one embodiment where the common display area is the same as in the example in FIG. 5, and the same hierarchically associated item lists with meta data are used as in the example in FIG. 5. A user can be prompted to selects one of several meta data categories, such as 'Pop', 'Country', 'Rock' and 'Jazz', to define the top or root level in the hierarchy. If a user selects the meta data item 'Country' 600, in display view 1, from the top hierarchical items list, the whole items list with will be scrolled, within view 1, so that item 'Country' is positioned at the top 600 of the display view 1 and an indented items list of artists 601 is inserted, between the items 'Country' and 'Jazz', in display view 1. The scrolling of items indicated by a scroll bar 604 placed at the right hand side of the display view. If a user chooses to select item 'Artist 2' from said indented list of items, a new indented list of album items are inserted between said 'Artist 2' and 'Artist 3' 602 in said display view 1. If item 'Album 2' is selected a new display view with an indented items list comprising 'Song' items 606 hierarchically related to the 'Album 2' items are inserted in the same manner, in said view 2. The name of the 'Album 2' item is placed on the top of display view 2 to give a reference of the hierarchical belonging of the 'Song' items. The displaying of the hierarchical associated items 'Country', 'Artist 2' and 'Album 2', are all displayed as an indented tree structure in the same view of the display area, not in separate views as in the example in FIG. 5, while the items 'Song' is placed in a separate display view. The hierarchical tree structure, consisting of the levels associated with the items 'Country', 'Artist 2' and 'Album 2', is scrollable in the same view as indicated by the scroll bar 604. The 'Song' items in display view is also scrollable via a scroll bar 604.

The tree structure makes navigating among the items very user friendly and it clearly shows how items are related to each other and where in the structure one are, which mitigates the effect of feeling lost in the tree structure. Note that this example comprises a plurality of levels, but the user can choose to have fewer, as well as more, levels for the dynamically selected hierarchy, depending on the desires of the user. In the example discussed above, a user has been able to set up the dynamically assigned hierarchy tree structure, but it is readily understood that this set-up can be made by an administrator of the media library, or which type of items to be structured, a service provider, or an operator.

Figure 7:
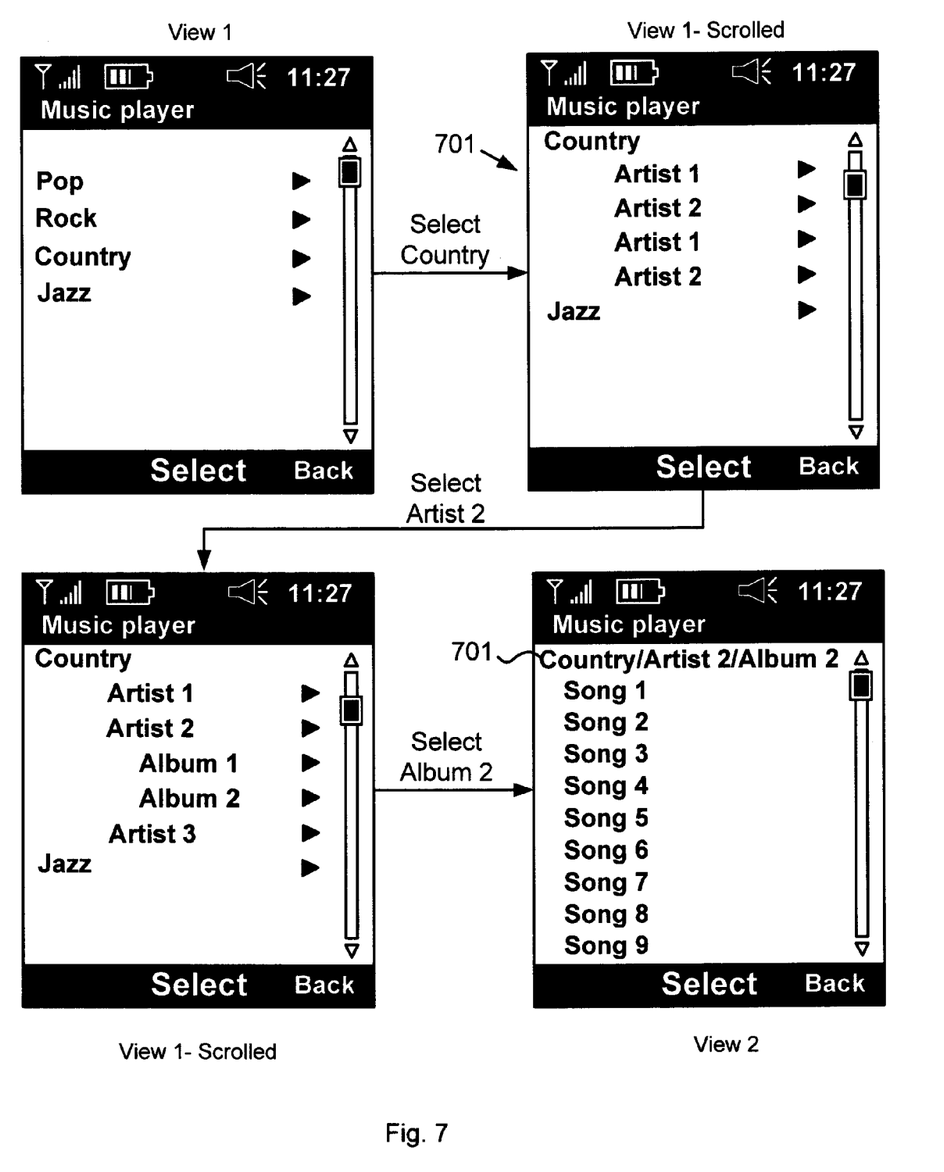
FIG. 7 shows a display view.

FIG. 7 illustrates a similar embodiment as in FIG. 6, showing a hierarchical tree structure with indented list items of meta data 700. The embodiment in FIG. 7 have a hierarchical address bar 701 showing, in display view 2, the selections made throughout the hierarchical tree structure down to the leaf level where the 'Song' items are displayed. This will enhance the perceptual view of where the user is in the hierarchical tree structure.

Figure 8:
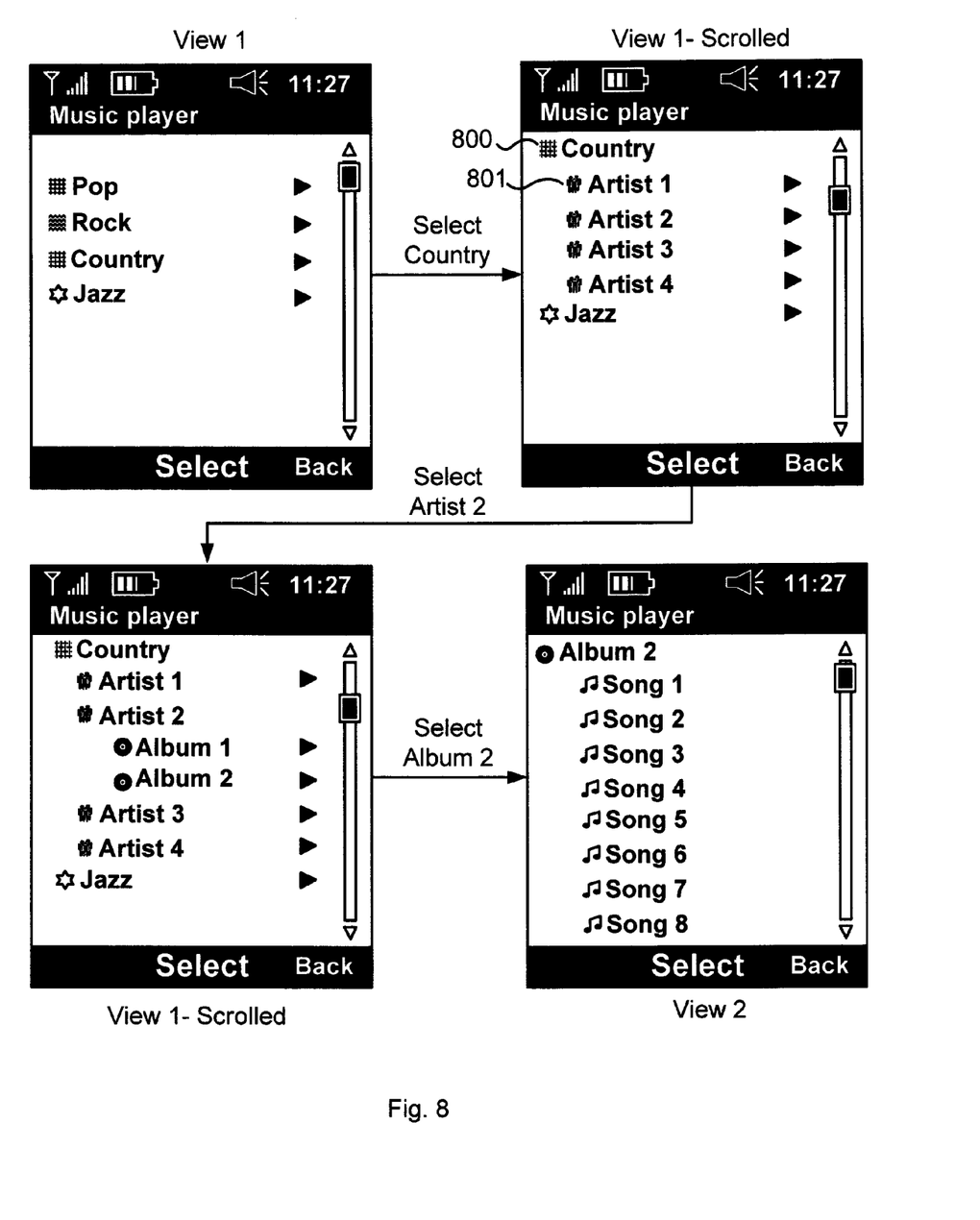
FIG. 8 shows a display view.

One way of enhancing the indented tree structure, and to give the user more visual cues of where in the hierarchical tree structure one resides, is to add a visual cue, such as an symbol, in front of similar items on the same level in the hierarchical structure. FIG. 8 shows an embodiment with added visual cues to similar items in the tree structure. In the example in FIG. 8 the visual cues are made up of different symbols. The 'Country' item on the top level in the tree structure is marked by a square checkered object 800 and the 'Artist 1' item is marked with a "crowd of people" object 801. However, visual cues are not limited to the symbols presented in the example in FIG. 8, or even symbols for that matter. They could consist of any type of differentiating object or marking such as animated objects, different font styles, different colorations of the fonts or different backgrounds of items belonging to the same level, etc. This enhancement to the indented tree structure is especially efficient to use in handheld devices such as smart phones, PDAs, etc.

Figure 9:
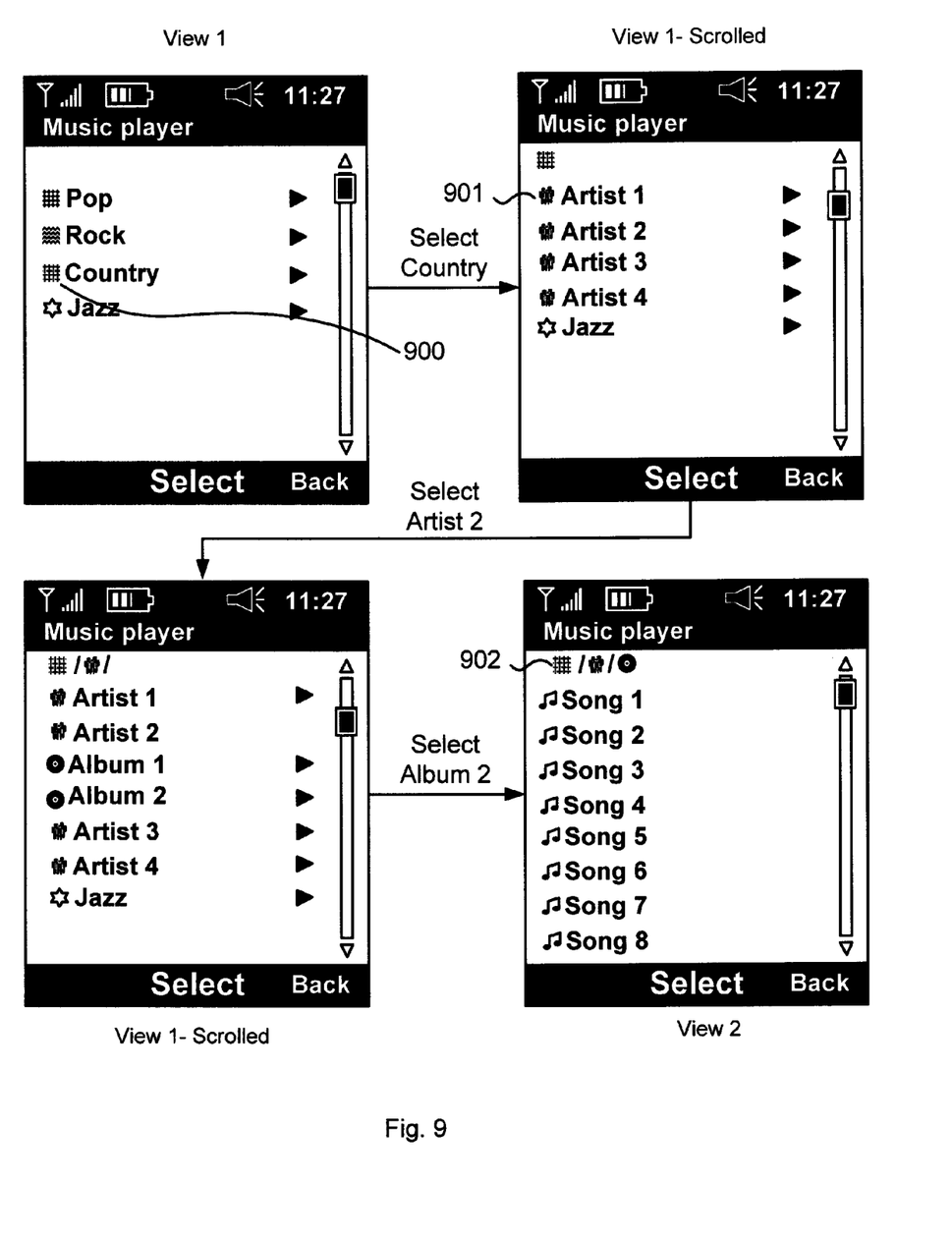
FIG. 9 shows a display view.

If the display area of the mobile communication apparatus is extremely precious, such as in a small sized cell phone, an alternative way of communicating the hierarchical level information is by using visual cues only and removing the indenting and thereby compacting the display space needed for the hierarchical structure. One example of this is shown in FIG. 9 where the visual cues are represented by symbols as in the example in FIG. 8. Each item list belonging to a specific hierarchical level share the same icon. For example the 'Country' item is indicated by a square checkered object 900 in front of the item name, the item 'Artist 1' has a 'crowd of people' object 901 and so on. The symbol will in this case serve as a visual cue, and group similar items and indicate which level in the hierarchical tree structure the item or the group of items belongs to. To enhance the compacted hierarchical structure presented in FIG. 9 even more, a hierarchical address bar 902, similar to the one in FIG. 8, consisting of the visual cues, is placed on the top of the display area. Thereby, showing the user on which level in the hierarchical structure one are. In the example in FIG. 9 the symbols 902 in display view 2 communicate that the user have previous selected the 'Country' level, 'Artist' level, 'Album' level and are currently at the 'Song' level. As in the case of the examples in FIG. 8 the visual cue does not have to be in the form of symbols only.

The invention claimed is:

1. A method comprising:
sorting items in an hierarchy according to metadata;
displaying a first list of items belonging to an highest hierarchical level in a display view;
enabling selection of a first item among said highest hierarchical level items;
upon selection of said first item, scrolling the first item to a top of the display view, and inserting a second list in said display view between said first item and subsequent highest hierarchical level items, the second list comprising at least one item belonging to a middle hierarchical level between said first item and subsequent highest hierarchical level items for enabling selection of a second item from said second list, wherein said at least one item in said second list is hierarchically associated with said first item having at least one metadata item in common; and
upon selection of said second item, determining if a next lower level of said hierarchy is the lowest level and if so displaying a third list in another display view, said third list comprising at least one item belonging to a lowest hierarchical level and receiving a selection of third item from said third list and rendering said third item;

and if a next lower level is not the lowest level, inserting a third list in said display view between said second item and subsequent middle hierarchical level items without automatically scrolling said second item to a top of said display view, the third list comprising at least one item belonging to a lower hierarchical level between said second item and subsequent middle hierarchical level items for enabling selection of a third item from said third list, wherein said at least one item in said third list is hierarchically associated with said first item having at least one metadata item in common and hierarchically associated with said second item having at least two metadata items in common.

2. The method according to claim 1, further comprising displaying a further list in said display view, upon selection of a previous item in a previous inserted list, the further list comprising at least one item belonging to a lower hierarchical level between said previous item and previous subsequent items, for enabling selection of a item from said further list, wherein said further list is hierarchically associated with said previous item.

3. The method according to claim 2, further comprising indenting said inserted further list compared to said previous list.

4. The method according to claim 1, further comprising displaying a first list of artist items belonging to a higher hierarchical level in a display view, upon selection of said artist item, a list comprising at least one album item, belonging to a lower hierarchical level, is inserted in the same display view between said artist item and subsequent artist items, and upon selection of said artist item, a list comprising at least one renderable song item, belonging to the lowest hierarchical level, is displayed in a further display view, wherein said further list is hierarchically associated with said artist item.

5. The method according to claim 1, further comprising displaying a first list of genre items belonging to a higher hierarchical level in a display view, upon selection of said genre item, a list comprising at least one artist item, belonging to a lower hierarchical level, is inserted in the same display view between said genre item and subsequent genre items, and upon selection of said genre item, a list comprising at least one album item, belonging to a lower hierarchical level, is inserted in the same display view between said artist item and subsequent artist items, and upon selection of said artist item, a list comprising at least one renderable song item, belonging to the lowest hierarchical level, is displayed in a further display view, wherein said further list is hierarchically associated with said artist item.

6. The method according to claim 5, wherein said items are items of the group comprising:

a media library item, a playlist item, and a tracklist item.

7. The method according to claim 1, further comprising indenting said inserted second list compared to said first list.

8. The method according to claim 1, further comprising rendering a media item belonging to the lowest hierarchical level, associated with said previous item, upon selection of said media item belonging to the lowest hierarchical level.

9. The method according to claim 1, further comprising scrolling items such that said first item is displayed uppermost of the displayed items.

10. The method according to claim 1, further comprising providing symbols as visual cues to differentiate between said lists.

11. The method according to claim 1, further comprising providing symbols, at the top of said display view, as visual cues to indicate active level in the hierarchical structure.

12. The method according to claim 1, further comprising providing arrows as visual cues to indicate the existence of selectable sub levels containing hierarchical connected items.

13. The method according to claim 1, further comprising selection from any list in the hierarchical structure.

14. The method according to claim 1, wherein said metadata comprises one item taken from a group consisting of genre, artist, album and song.

15. The method according to claim 1, further comprising displaying in said another view a line indicating the first and second items selected.

16. An apparatus comprising:

a processor arranged to sort items in an hierarchy according to metadata;

a display arranged to display a view comprising a first list of items belonging to an highest hierarchical level; and a navigation device arranged to navigate among items displayed on said display, and being capable of enabling selection of a first item among said highest hierarchical level items by said navigation device, wherein upon selection of said first item, the display being arranged to scroll the first item to a top of the display view, and to insert into said view a second list on said display between said first item and subsequent highest hierarchical level items, the second list comprising at least one item belonging to a middle hierarchical level between said first item and subsequent higher hierarchical level items for enabling selection of a second item from said second list, wherein said at least one item in said second list is hierarchically associated with said first item having at least one metadata item in common; and upon selection of said second item, the processor being arranged to determine if a next lower level of said hierarchy is the lowest level and if so the display being arranged to displaying a third list in another display view, said third list comprising at least one item belonging to a lowest hierarchical level and the navigation device being arranged to receive a selection of third item from said third list and the display further being arranged to render said third item;

and if a next lower level is not the lowest level, the display being arranged to insert a third list in said display view between said second item and subsequent middle hierarchical level items without automatically scrolling said second item to a top of said display view, the third list comprising at least one item belonging to a lower hierarchical level between said second item and subsequent middle hierarchical level items for enabling selection of a third item from said third list, wherein said at least one item in said third list is hierarchically associated with said first item having at least one metadata item in common and hierarchically associated with said second item having at least two metadata items in common.

17. The apparatus according to claim 16, being arranged to display a further list in said display view, upon selection of said previous item in a previous inserted list, the further list comprising at least one item belonging to a lower hierarchical level between said previous item and previous subsequent items for enabling selection of a item from said further list, wherein said further list is hierarchically associated with said previous item.

18. The apparatus according to claim 16, further being arranged to scroll items such that said first item is displayed uppermost of the displayed items on the display.

19. The apparatus according to claim 16, further comprising a media library, wherein said items are items in the media library.

20. The apparatus according to claim 16, further comprising a media library item, a playlist item, and a tracklist item.

21. The apparatus according to claim 16, belonging to a group comprising: PDA, mobile communication apparatus, portable media player.

22. A computer-readable storage medium having computer-executable components comprising instructions for
sorting items in an hierarchy according to metadata;
displaying a first list of items in a display view belonging to an hiqhest hierarchical level in a display view;
enabling selection of a first item among said highest hierarchical level items;
upon selection of said first item, scrolling the first item to a top of the display view, and inserting a second list in said display view between said first item and subsequent highest hierarchical level items, the second list comprising at least one item belonging to a middle hierarchical level between said first item and subsequent highest hierarchical level items for enabling selection of a second item from said second list, wherein said at least one item in said second list is hierarchically associated with said first item having at least one metadata item in common; and
upon selection of said second item, determining if a next lower level of said hierarchy is the lowest level and if so displaying a third list in another display view, said third list comprising at least one item belonging to a lowest hierarchical level and receiving a selection of third item from said third list and rendering said third item;
and if a next lower level is not the lowest level, inserting a third list in said display view between said second item and subsequent middle hierarchical level items without automatically scrolling said second item to a top of said display view, the third list comprising at least one item belonging to a lower hierarchical level between said second item and subsequent middle hierarchical level items for enabling selection of a third item from said third list, wherein said at least one item in said third list is hierarchically associated with said first item having at least one metadata item in common and hierarchically associated with said second item having at least two metadata items in common.

23. The computer-readable storage medium according to claim 22, further comprising instructions for displaying a further list in said display view, upon selection of said previous item in a previous inserted list, the further list comprising at least one item belonging to a lower hierarchical level between said previous item and previous subsequent items for enabling selection of a item from said further list, wherein said further list is hierarchically associated with said previous item.

24. The computer-readable storage medium according to claim 22, further comprising instructions for rendering a media item associated with said second item upon selection of said second item.

25. The computer-readable storage medium according to claim 22, comprising instructions for indenting said inserted second list compared to said first list.

* * * * *